United States Patent
Takeuchi et al.

(10) Patent No.: US 11,265,470 B2
(45) Date of Patent: Mar. 1, 2022

(54) CONTROL APPARATUS, IMAGE PICKUP APPARATUS, AND LENS APPARATUS

(71) Applicant: CANON KABUSHIKI KAISHA, Tokyo (JP)

(72) Inventors: Kenji Takeuchi, Yokohama (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 17/001,808

(22) Filed: Aug. 25, 2020

(65) Prior Publication Data
US 2021/0067697 A1    Mar. 4, 2021

(30) Foreign Application Priority Data

Aug. 27, 2019   (JP) .............................. JP2019-154248

(51) Int. Cl.
*H04N 5/232*    (2006.01)
*H04N 5/235*    (2006.01)

(52) U.S. Cl.
CPC ....... *H04N 5/23258* (2013.01); *H04N 5/23253* (2013.01); *H04N 5/23267* (2013.01); *H04N 5/23287* (2013.01)

(58) Field of Classification Search
CPC ........... H04N 5/23258; H04N 5/23267; H04N 5/23287; H04N 5/2353; H04N 5/23248; H04N 5/23251; H04N 5/23264; H04N 5/2328

See application file for complete search history.

(56) References Cited

U.S. PATENT DOCUMENTS

| | | | |
|---|---|---|---|
| 2009/0002825 A1* | 1/2009 | Morita | H04N 5/23258 359/554 |
| 2010/0141761 A1* | 6/2010 | McCormack | H04N 5/23248 348/143 |
| 2020/0322517 A1* | 10/2020 | Tani | G03B 17/38 |

FOREIGN PATENT DOCUMENTS

JP    2011-145354 A    7/2011

* cited by examiner

*Primary Examiner* — Albert H Cutler
(74) *Attorney, Agent, or Firm* — Cowan, Liebowitz & Latman, P.C.

(57) ABSTRACT

A control apparatus includes a calculating filter configured to perform a calculation process based on a signal from a shake detector used for an image stabilization, and a correcting filter to which an output signal from the calculating filter is input. The correcting filter includes a boost filter configured to change a gain based on a first frequency and a second frequency, and a notch filter having a center frequency between the first frequency and the second frequency.

13 Claims, 15 Drawing Sheets

CONTROL APPARATUS, IMAGE PICKUP APPARATUS, AND LENS APPARATUS

BACKGROUND OF THE INVENTION

Field of the Invention

The present invention relates to an image pickup apparatus, such as a digital camera and a digital video camera.

Description of the Related Art

Japanese Patent Laid-Open No. ("JP") 2011-145354 discloses an image stabilization control apparatus that can provide accurate image stabilization, by compensating, in a frequency band of camera shakes, for a phase shift that occurs when a shake signal indicating shakes of an image pickup apparatus is converted into a signal for the image stabilization.

However, the signal processing by the image stabilization control apparatus disclosed in JP 2011-145354 increases low-frequency noises superimposed on the shake signal, and cannot improve the image stabilization performance.

SUMMARY OF THE INVENTION

The present invention provides a control apparatus, an image pickup apparatus, and a lens apparatus, each of which can improve image stabilization performance without increasing low-frequency noises.

A control apparatus according to one aspect of the present invention includes a calculating filter configured to perform a calculation process based on a signal from a shake detector used for an image stabilization, and a correcting filter to which an output signal from the calculating filter is input. The correcting filter includes a boost filter configured to change a gain based on a first frequency and a second frequency, and a notch filter having a center frequency between the first frequency and the second frequency.

An image pickup apparatus and a lens apparatus each having the above control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
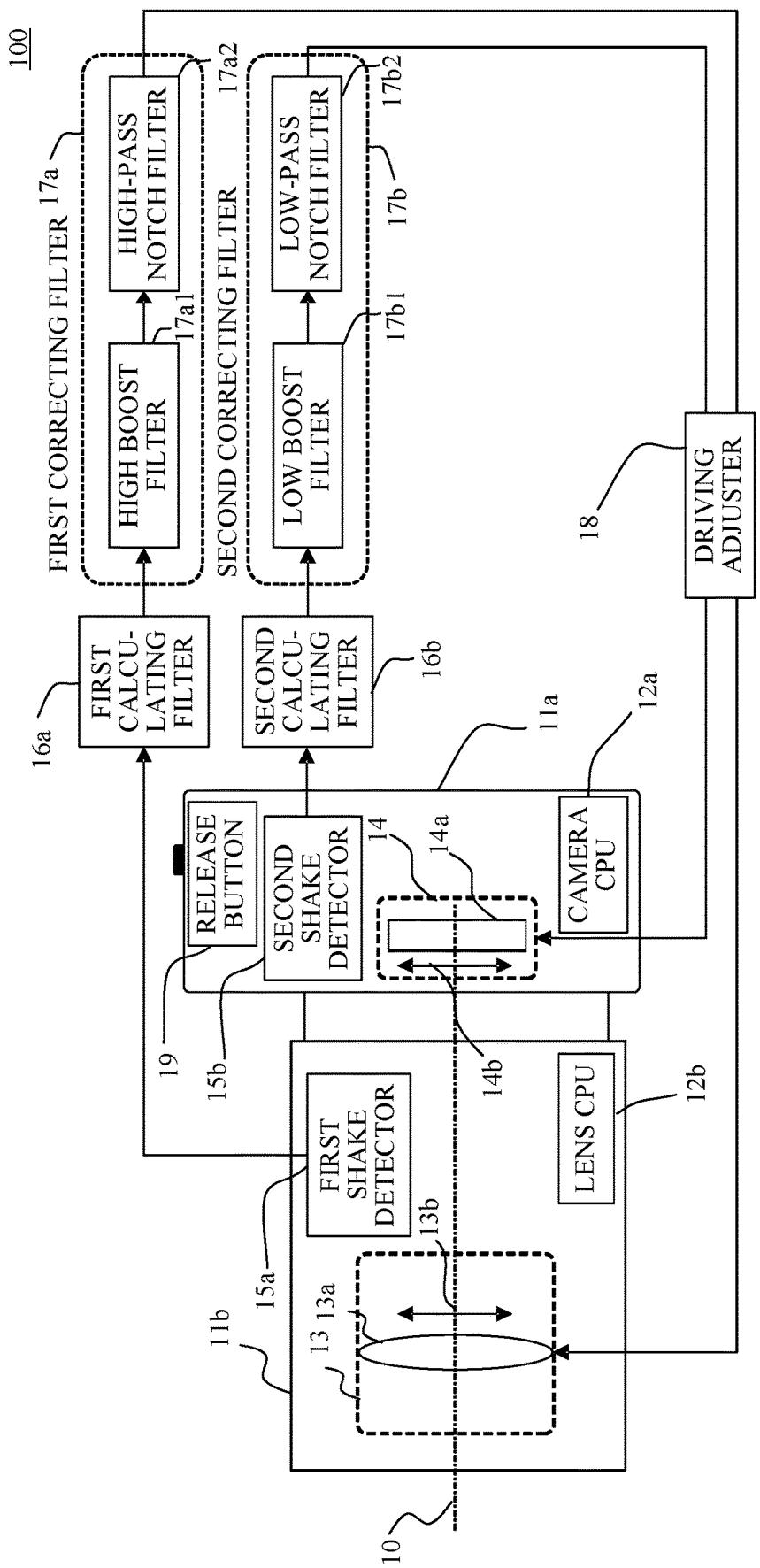
FIG. 1 is a cross-sectional view and a control block diagram of an image pickup apparatus according to a first embodiment.

Referring now to FIG. 1, a description will be given of an image pickup apparatus according to a first embodiment of the present invention. FIG. 1 illustrates a cross-section view and a control block diagram of an image pickup apparatus (camera) 100 according to this embodiment. The image pickup apparatus 100 includes a camera body (image pickup apparatus body) 11a and an interchangeable lens (lens apparatus) 11b that can be attached to and detached from the camera body 11a. This embodiment is not limited to this example, and is applicable to an image pickup apparatus in which a camera body and a lens apparatus are integrated with each other.

A camera CPU 12a provided in the camera body 11a controls an operation of each block described later with reference to FIG. 1 in response to an imaging instruction operation from a photographer, etc. As illustrated in FIG. 1, an object light flux along an optical axis (imaging optical axis) 10 enters an image sensor (imager) 14 through an imaging optical system 13. The image sensor 14 has a CMOS sensor or a CCD sensor, photoelectrically converts an optical image formed via the imaging optical system, and outputs an image signal (outputs a signal in response to the input object light flux). In general, a signal output from the image sensor 14 undergoes image processing by an image processer, and the resultant image information is stored in an unillustrated memory.

Part of the imaging optical system 13 constitutes a first image stabilizer 13a, and is driven by an unillustrated drive mechanism in a direction indicated by an arrow 13b (a direction orthogonal to the optical axis 10). This driving can correct image blurs generated on the imaging plane of the image sensor 14.

A first shake detector 15a includes an angular velocity sensor, and is mounted on the interchangeable lens 11b. A first calculating filter 16a integrates the signal from the first shake detector 15a, and converts it into an angular signal. The angular signal output from the first calculating filter 16a is input to a first correcting filter 17a (a high boost filter 17a1 and a high-pass notch filter 17a2) described later, and input to the first image stabilizer 13a via the first correcting filter 17a and the driving adjuster 18. The first image stabilizer 13a detects a position of an image stabilizing lens (blur correcting lens), and controls a position using the known feedback control so that the position of the image stabilizing lens follows the target position output from the driving adjuster 18 for image stabilization driving.

The image sensor 14 constitutes a second image stabilizer 14a, and is driven by an unillustrated drive mechanism in a direction orthogonal to the optical axis 10 shown by an arrow 14b. The image sensor 14 corrects image blurs caused on the imaging plane of the image sensor 14 by its driving.

The second shake detector 15b is an angular velocity sensor, and mounted on the camera body 11a. The second calculating filter 16b integrates the signal from the second shake detector 15b, and converts it into an angular signal. The angular signal output from the second calculating filter 16b is input to a second correcting filter 17b (low boost filter 17b1 and low-pass notch filter 17b2) described later, and input to the second image stabilizer 14a via the second correcting filter 17b and the driving adjuster 18. The second image stabilizer 14a detects the position of the image sensor 14, and controls a position using the known feedback control so that the position of the image sensor 14 follows the target position output by the driving adjuster 18 for the image stabilization driving.

The first image stabilizer 13a and the second image stabilizer 14a each correct a predetermined ratio (drive ratio) determined by the driving adjuster 18 among the shake amounts detected by the first shake detector 15a and the second shake detector 15b. The first image stabilizer 13a and the second image stabilizer 14a simultaneously perform the image stabilization, thereby supplementing mutual insufficient image stabilization effects. A description will now be given of a case where the drive ratio is halved.

Referring now to FIGS. 2A to 2D, a description will be given of the frequency characteristics of the first calculating filter 16a and the second calculating filter 16b. FIGS. 2A to 2D are Bode diagrams of the first calculating filter 16a and the second calculating filter 16b. In FIGS. 2A to 2D, the abscissa axis represents the blur frequency, and the ordinate axis represents output gains (FIGS. 2A and 2C) and phases (FIGS. 2B and 2D) of the first calculating filter 16a and the second calculating filter 16b for the input signals of the first shake detector 15a and the second shake detector 15b, respectively. The first calculating filter 16a and the second calculating filter 16b are calculating filters that respectively perform calculation processes based on signals from the first shake detector 15a and the second shake detector 15b.

Figure 2A:
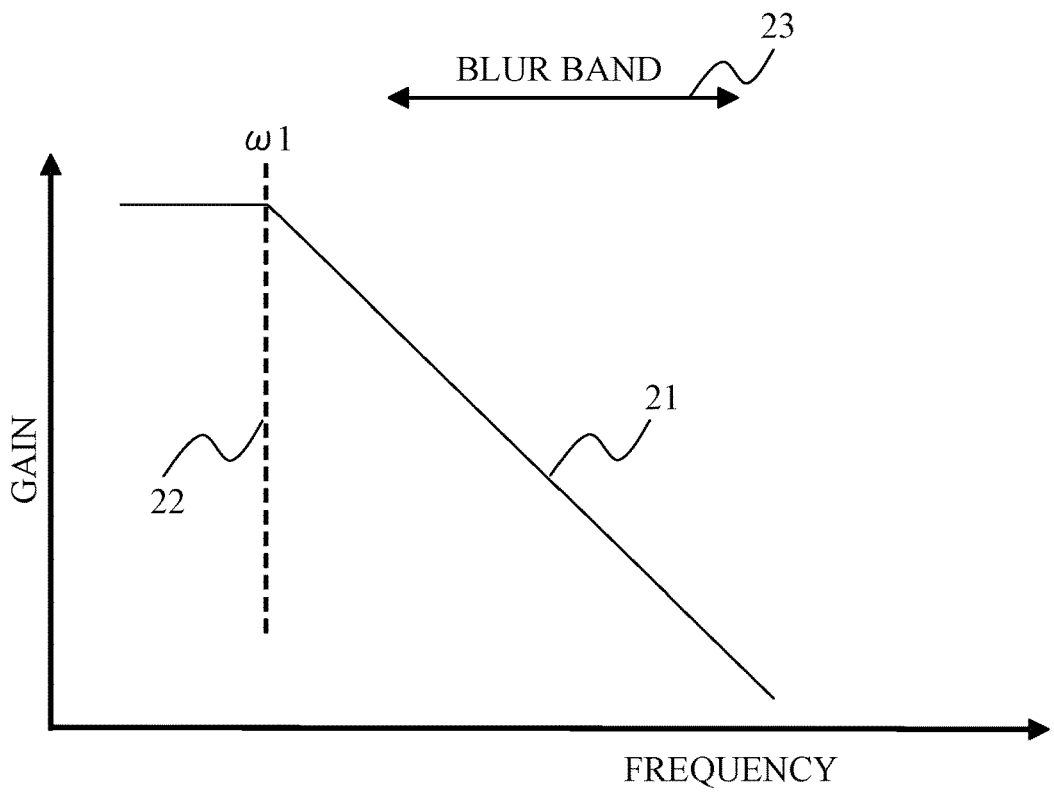
FIGS. 2A to 2D are Bode diagrams of a calculating filter according to the first embodiment.

In FIG. 2A, a line segment 21 represents a gain characteristic of an integral filter which is a calculating filter, and a signal having a frequency higher than a break frequency $\omega 1$ (broken line 22) which is an integral start frequency has a characteristic of a first-order integral (gain inversely proportional to the frequency). The signals of the first shake detector 15a and the second shake detector 15b are first-order integrated by the first calculating filter 16a and the second calculating filter 16b, and the angular velocity signal of frequency $\omega 1$ or higher is converted into an angular signal. The break frequency $\omega 1$ is set to a frequency lower than a shake (or blur) band 23 to be detected. For example, when the shake to be detected ranges from 1 Hz to 10 Hz, the break frequency $\omega 1$ is set to 0.1 Hz. In general, the frequency band of camera shakes is about 1 to 10 Hz, and a range of about 1 to 10 Hz is set to a shake band to be detected in the shake detector 15. In order to sufficiently cover the shake band, about 0.1 Hz to 0.01 Hz, which is about 1/10 of the lower limit of 1 Hz, is usually set to the break frequency.

Figure 2B:
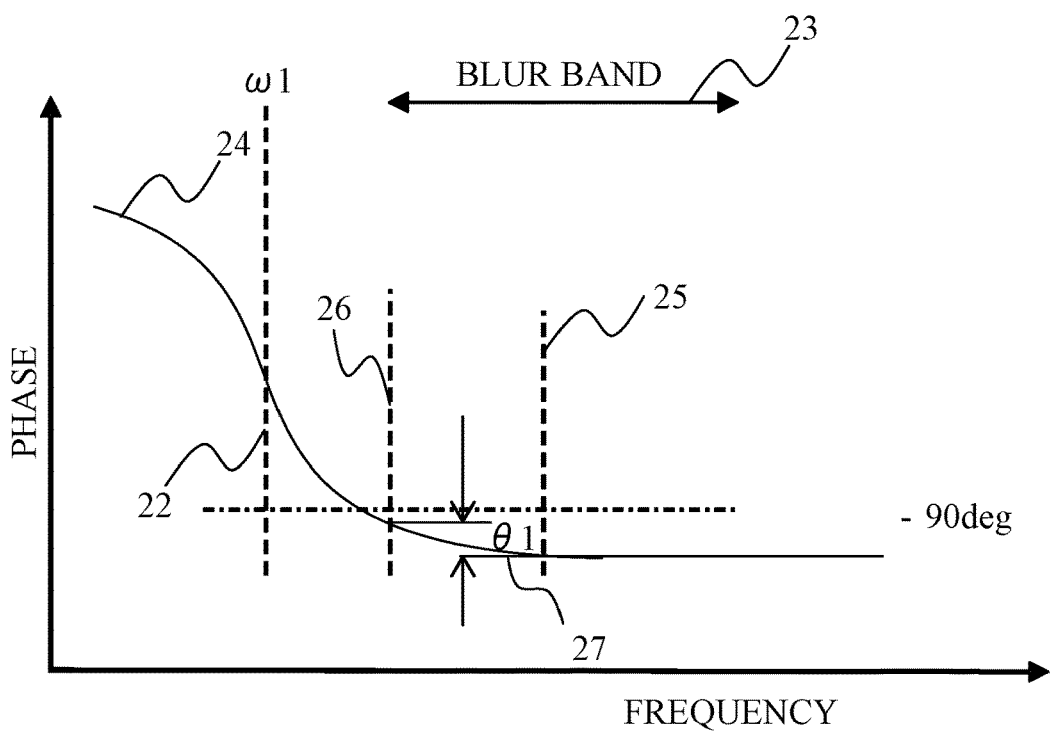

In FIG. 2B, a line segment 24 represents the phase characteristics of the first calculating filter 16a and the second calculating filter 16b, and a signal having a frequency higher than the break frequency $\omega 1$ (broken line 22) has a characteristic in which a phase (phase difference) approaches to −90 degrees as the frequency becomes higher.

Figure 3A:
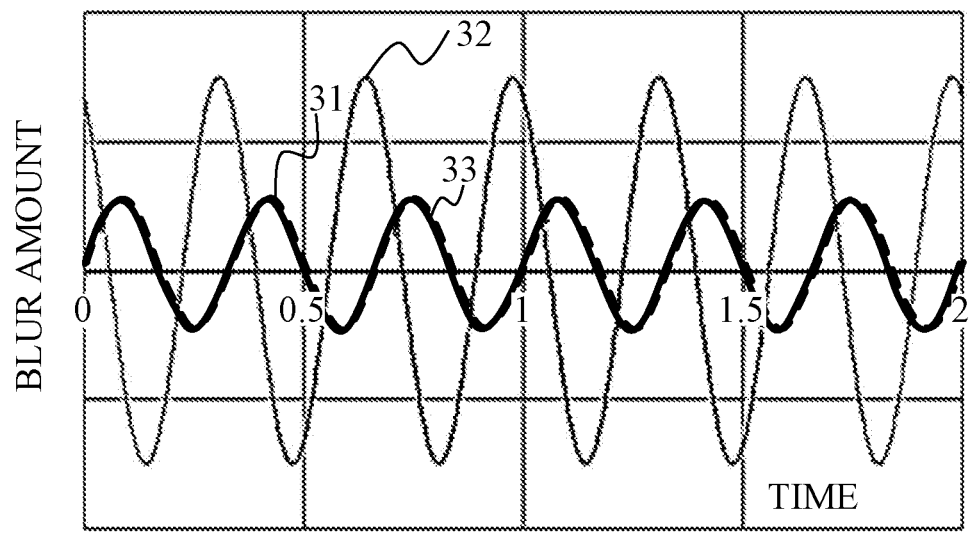
FIGS. 3A and 3B are signal waveform diagrams of the calculating filter according to the first embodiment.
Figure 3B:
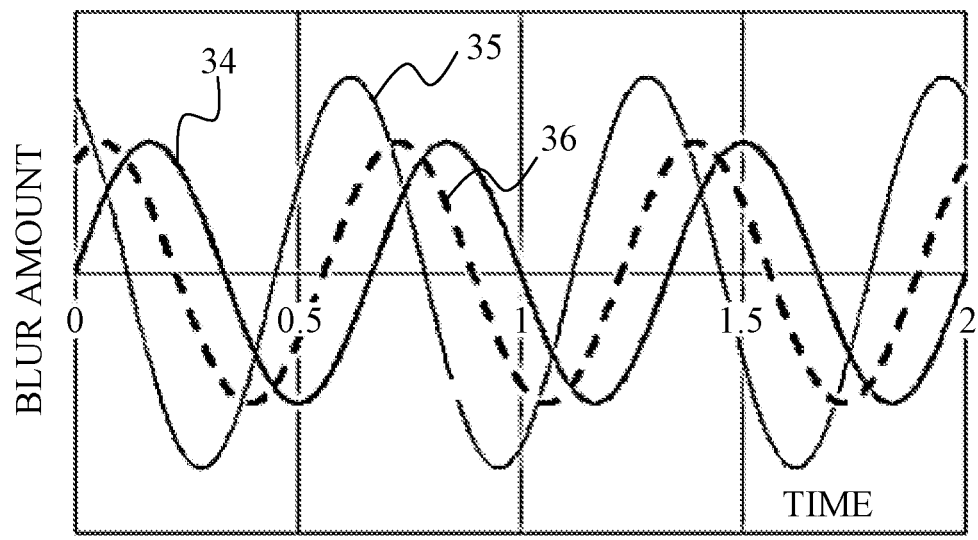

FIGS. 3A and 3B are signal waveform diagrams of the calculating filter. In FIGS. 3A and 3B, the abscissa axis represents time and the ordinate axis represents a blur (or shake) amount. In FIGS. 3A and 3B, reference numerals 31 and 34 denote waveforms of actual blur angles, and reference numerals 32 and 35 denote blur angular velocities (blur angular velocity signals) detected by the first shake detector 15a and the second shake detector 15b. Reference numerals 33 and 36 denote integral signals obtained by processing the signals from the first shake detector 15a and the second shake detector 15b by the first calculating filter 16a and the second calculating filter 16b. The first shake detector 15a and the second shake detector 15b are located in the interchangeable lens 11b and the camera body 11a, respectively, but similarly detect the blur angular velocity signals regardless of their locations and thus FIGS. 3A and 3B similarly illustrate the blur angular velocity.

In FIG. 3A, at a shake having a frequency higher than the break frequency $\omega 1$ (frequency of a broken line 25 in FIG. 2B), an integral signal (angle waveform) 33 obtained by integrating the shake angular velocity 32 coincides with the actual shake angle 31, and the integral signal 33 can accurately detect the actual blur angle.

On the other hand, in FIG. 3B, at a blur near the break frequency $\omega 1$ (the frequency shown by the broken line 26 in FIG. 2B, which is the low frequency limit in the shake band), the integral signal (angle waveform) 36 obtained by integrating the blur angular velocity 35 has a phase lead. In other words, the integral signal 36 has a phase lead of $\theta 1$ (27 in FIG. 2B) relative to the actual blur angle 34 from −90 degrees which is an ideal integral lag characteristic. Thus, the integral signal 36 does not match the actual blur angle 34, and an accurate blur angle cannot be detected.

FIGS. 2A and 2B describe the first calculating filter 16a and the second calculating filter 16b using the calculating filters that integrate high frequencies equal to or higher than the frequency $\omega 1$ (broken line 22), but even when the calculating filters ideally integrate all frequencies, the phase problem often remains. For example, the phenomena explained in FIGS. 3A and 3B are applied even when a high-pass filter is used which attenuates a low frequency equal to or lower than the frequency $\omega 1$ so as to cut the bias signal superimposed on the first shake detector 15a and the second shake detector 15b.

Figure 2C:
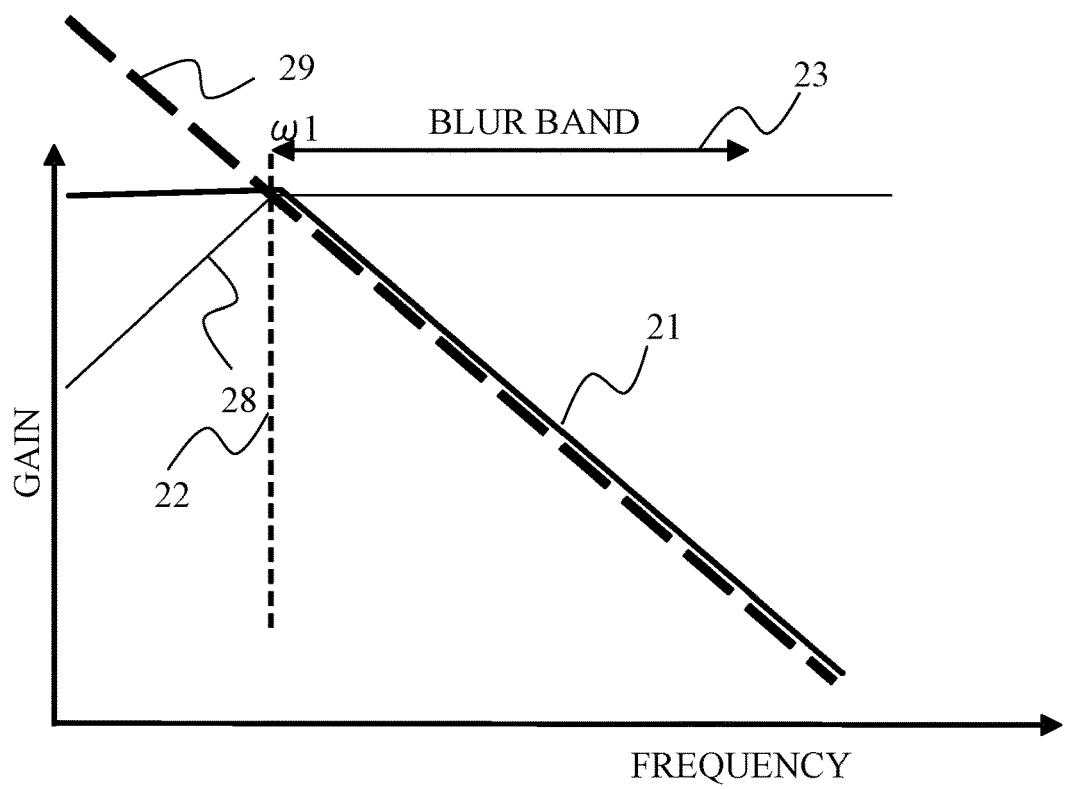
Figure 2D:
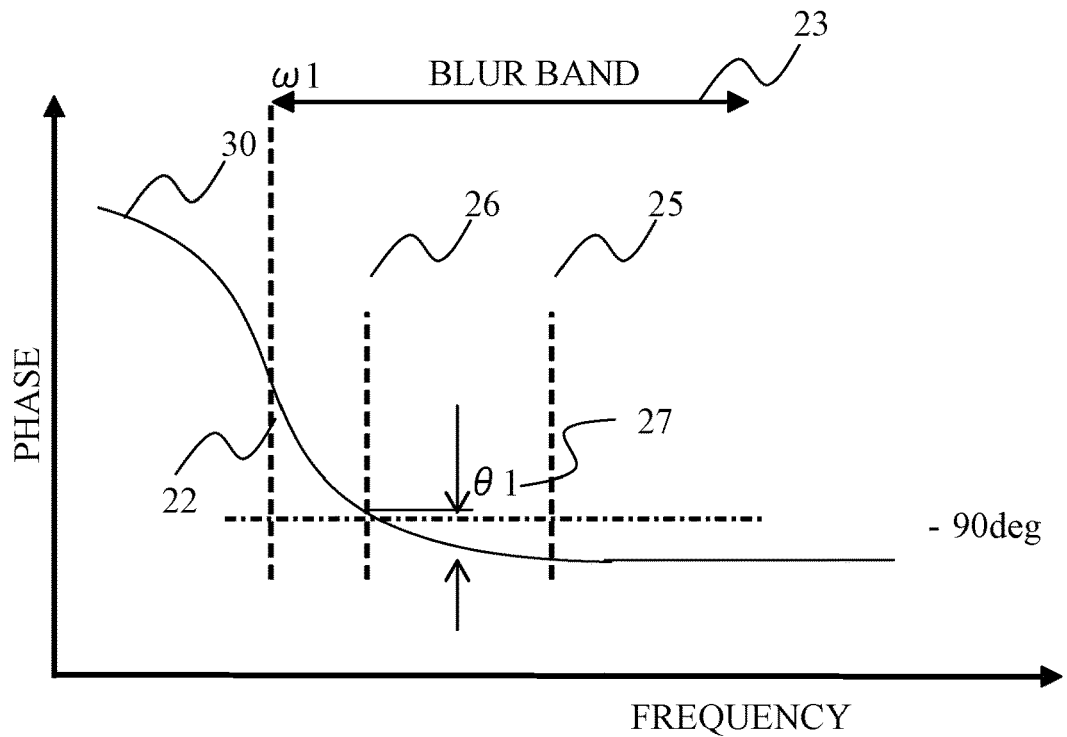

In the Bode diagram in FIG. 2C, the high-pass filter can be represented as the gain characteristic shown by a line segment 28. The gain characteristic shown by the line segment 28 is such that a signal having a frequency lower than the frequency $\omega 1$ (broken line 22) attenuates, and when this characteristic and the gain characteristic of the ideal integral that can be expressed by a broken line segment 29 are connected in series, the gain characteristic shown by the thick line segment 21 is obtained. This is the same characteristic as the integral filter illustrated in FIG. 2A. Thus, the phase characteristic is the line segment 30 illustrated in FIG. 2D. This is the same as the phase characteristic in FIG. 2B. Therefore, even when the ideal integral and the high-pass filter are combined, the phase lead phenomenon occurs at the low frequency.

Now assume that the first image stabilizer 13a and the second image stabilizer 14a, which will be described later, are PID-controlled (Proportional-Integral-Differential controlled). At this time, the integral control therein serves as the high-pass filter. Thus, even if the high-pass filter described with reference to FIG. 2C is not used, the phase lead phenomenon occurs due to the combination of the PID control of each image stabilizer and the ideal integral.

The calculating filter 16 according to this embodiment may use an integral filter, a high-pass filter for the ideal integral, a PID control image stabilizer for the ideal integral, and a combination thereof.

Figure 4A:
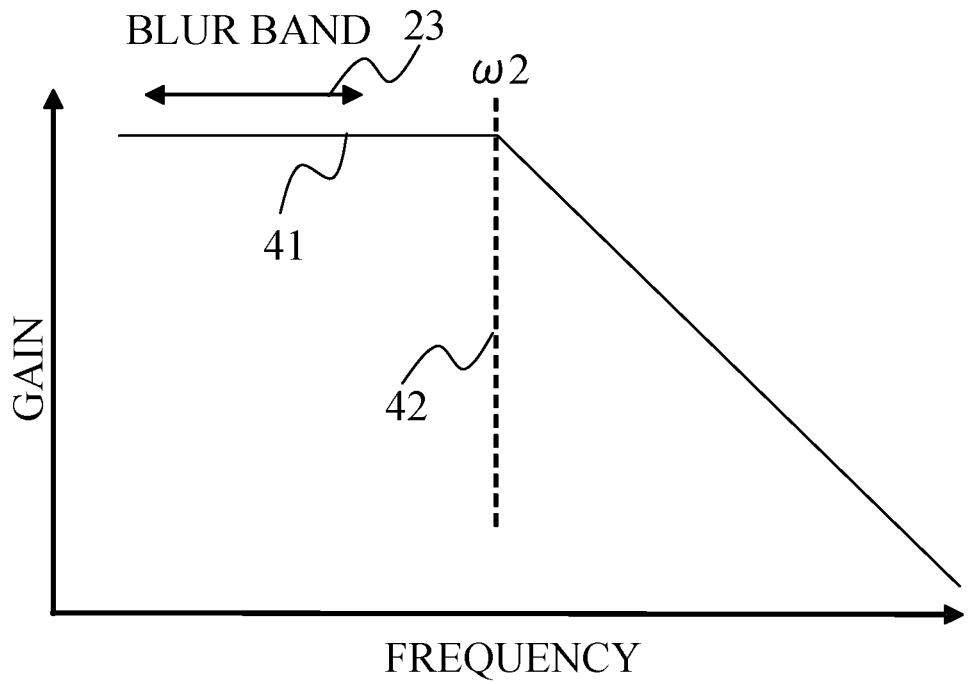
FIGS. 4A and 4B are Bode diagrams of an image stabilizer according to the first embodiment.
Figure 4B:
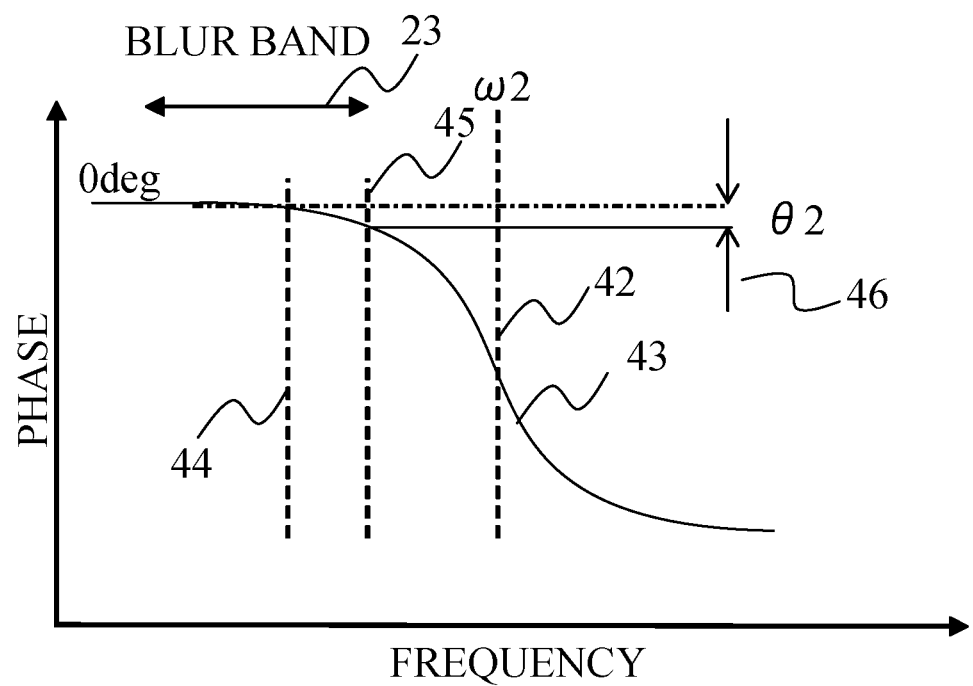

Referring now to FIGS. 4A and 4B, a description will be given of the frequency characteristics of the first image stabilizer 13a and the second image stabilizer 14a. FIGS. 4A and 4B are Bode diagrams of the first image stabilizer 13a and the second image stabilizer 14a. In FIGS. 4A and 4B, the abscissa axis represents the shake frequency, and the ordinate axis represents the drive gains (FIG. 4A) and phases (FIG. 4B) of the first image stabilizer 13a and the second image stabilizer 14a in response to the image-stabilizing target value input from the first calculating filter 16a and the second calculating filter 16b. A frequency $\omega 2$ (broken line 42) is a crossover frequency, which is a frequency determined by the drive characteristic based on the frequency characteristics of the first image stabilizer 13a and the second image stabilizer 14a and the frequency characteristic of the position controller described above.

In FIG. 4A, a line segment 41 indicates drive gains of the first image stabilizer 13a and the second image stabilizer 14a, and the signal with a frequency higher than the crossover frequency $\omega 2$ (broken line 42) has a reduced gain and a reduced driving amount. The first image stabilizer 13a and the second image stabilizer 14a cannot perform sufficient driving for the target drive value equal to or higher than the frequency $\omega 2$ (broken line 42). Accordingly, the crossover frequency $\omega 2$ (broken line 42) is set to a frequency higher than the shake band 23 for which the image stabilization is to be performed. For example, when the shakes for which the image stabilization is to be performed range from 1 Hz to 10 Hz, the crossover frequency $\omega 2$ (broken line 42) is set to 100 Hz.

In FIG. 4B, a line segment 43 represents a phase characteristic, and a signal having a frequency higher than the crossover frequency $\omega 2$ (broken line 42) has a characteristic such that the phase gradually approaches to $-180$ degrees as the frequency becomes higher. Recently, there has been known an image pickup apparatus equipped with an image stabilizer that uses the mass of the image sensor for the image stabilization, the mass of the lens for the image stabilization, and the balance of springs supporting them to ensure the image stabilization accuracy by the open control rather than the feedback control. In such an image pickup apparatus, a signal having a frequency higher than the natural frequency determined by the masses and the springs has a reduced gain and the phase gradually approaches to $-180$ degrees. The natural frequency in the image stabilizer in this open control is also defined as the crossover frequency $\omega 2$ (broken line 42) in this embodiment.

Figure 5A:
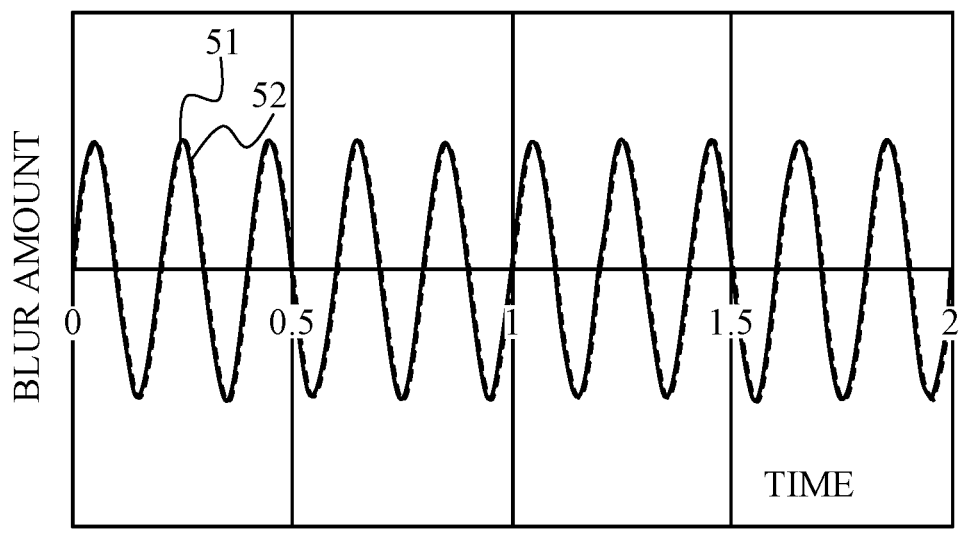
FIGS. 5A and 5B are signal waveform diagrams of the image stabilizer according to the first embodiment.
Figure 5B:
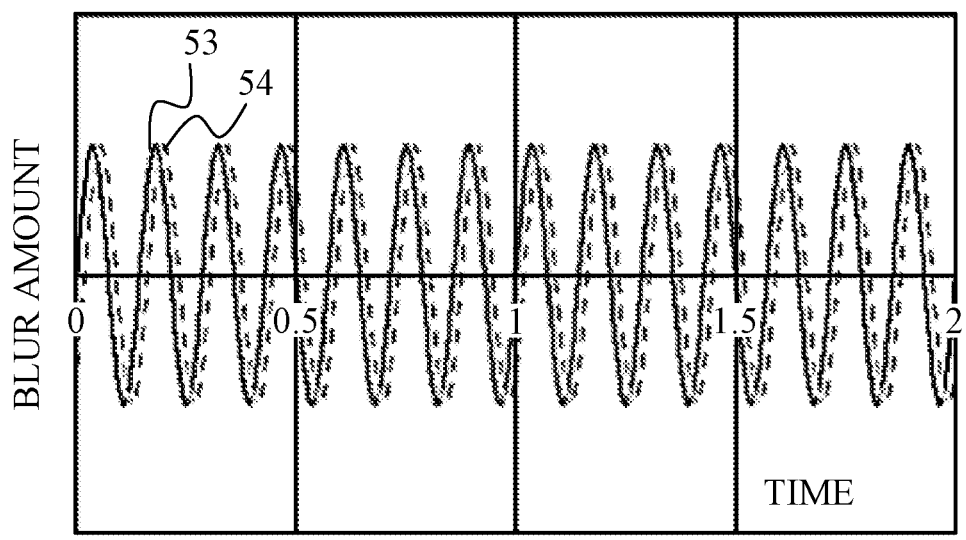

FIGS. 5A and 5B are signal waveform diagrams of the first image stabilizer 13a and the second image stabilizer 14a. In FIGS. 5A and 5B, the abscissa axis represents time and the ordinate axis represents a blur amount. In FIGS. 5A and 5B, waveforms (blur angle waveforms) 51 and 53 express the actual blur angles, and waveforms 52 and 54 express the image stabilizing waveforms (corresponding to the blur angle) of the first image stabilizer 13a and the second image stabilizer 14a.

In FIG. 5A, in the shakes with frequencies (frequencies shown by the broken line 44 in FIG. 4B) lower than the crossover frequency $\omega 2$ (broken line 42), the waveform 52 of the first image stabilizer 13a and the second image stabilizer 14a little delays relative to the actual waveform 51 and coincides with it. Therefore, accurate image stabilization is available.

On the other hand, in FIG. 5B, a phase lag occurs in the waveform in the shake (with the frequency shown by a broken line 45 in FIG. 4B and the high frequency limit in the blur band) near the crossover frequency $\omega 2$ (broken line 42). In other words, since the waveform 54 of the first image stabilizer 13a and the second image stabilizer 14a has a phase lag of $\theta 2$ (46 in FIG. 4B) relative to the actual waveform 53, accurate image stabilization is unavailable.

This embodiment provides the first correcting filter 17a and the second correcting filter 17b, in order to solve the problem of the shift of the image stabilizing waveform relative to the actual blur waveform described with reference to FIGS. 3B and 5B. The first correcting filter 17a and the second correcting filter 17b are boost filters that change the gain through the first break frequency $\omega 1$ and the second break frequency $\omega 2$. The boost filter can be expressed by a transfer function such as the following expression (1), and has a frequency characteristic of delaying the phase at the first break frequency $\omega 1$ and advancing the phase at the second break frequency $\omega 2$. When the second break frequency $\omega 2$ is set higher than the first break frequency $\omega 1$, the low boost filter is used. When the second break frequency $\omega 2$ is set lower than the first break frequency $\omega 1$, the high boost filter is used. In addition, s in the expression (1) represents the Laplacean.

$$\text{Transfer function } G = \frac{s + \omega_2}{s + \omega_1} \qquad (1)$$

In FIG. 1, the first correcting filter 17a is inserted between the first calculating filter 16a and the first image stabilizer 13a, and the second correcting filter 17b is inserted between the second calculating filter 16b and the second image stabilizer 14a. However, this embodiment is not limited to this example, and the first correcting filter 17a and the second correcting filter 17b may be provided between the first shake detector 15a and the first calculating filter 16a, and between the second shake detector 15b and the second calculating filter 16b, respectively.

Figure 6A:
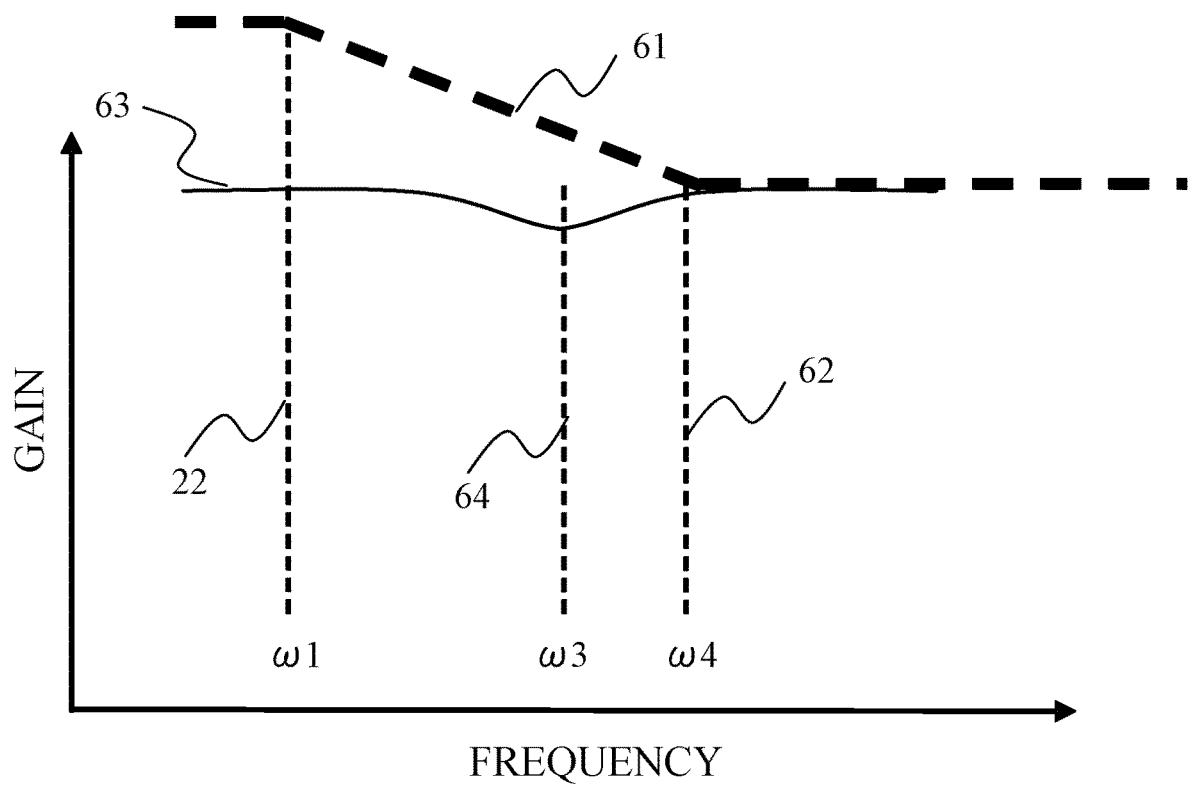
FIGS. 6A and 6B are Bode diagrams of a second correcting filter according to the first embodiment.
Figure 6B:
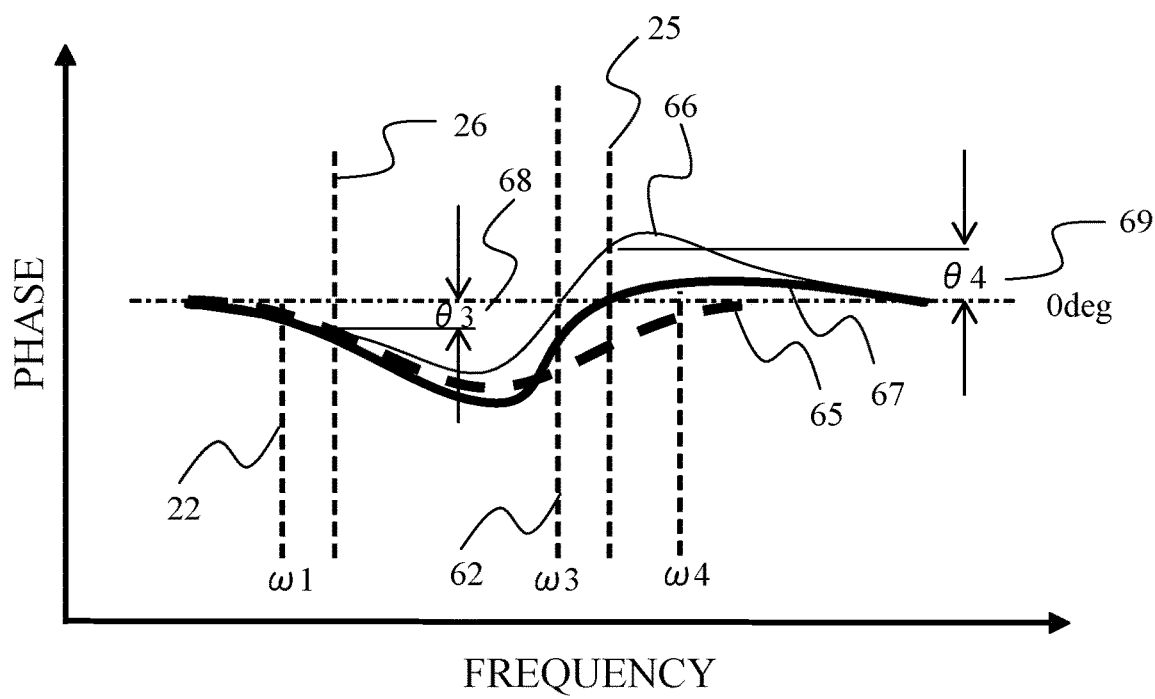

Referring now to FIGS. 6A and 6B, a description will be given of the frequency characteristics of the low boost filter 17b1 and the low-pass notch filter 17b2 that form the second correcting filter 17b. FIGS. 6A and 6B are Bode diagrams of the second correcting filter 17b. In FIGS. 6A and 6B, the abscissa axis represents the blur frequency, and the ordinate axis represents output gains (FIG. 6A) and phases (FIG. 6B) of the low boost filter 17b1 and the low-pass notch filter 17b2.

In FIG. 6A, a thick broken line segment 61 represents the output gain of the low boost filter 17b1. According to this characteristic, the break frequency $\omega 1$ (broken line 22) in FIG. 2A is set to the first break frequency, and the gain is attenuated as the frequency becomes higher up to the second break frequency $\omega 4$ (broken line 62) which is higher than the first break frequency. In FIG. 6A, a thin solid line segment 63 represents the output gain of the low-pass notch filter 17b2. A notch center frequency $\omega 3$ (broken line 64) is located between the first break frequency $\omega 1$ (broken line 22) and the second break frequency $\omega 4$ (broken line 62), and on the high frequency side of the center between the first break frequency $\omega 1$ and the second break frequency $\omega 4$.

Generally, a notch filter is used to eliminate voice noises and mechanical axial unnecessary vibrations by attenuating the gain near the notch center frequency. Therefore, the attenuation coefficient of the notch filter is set extremely small (such as ζ=0.01), and the gain attenuation amount by the notch filter is increased so that the output gain at the notch center frequency ω3 (broken line 62) becomes extremely small. However, this embodiment addresses the phase change of the notch filter, and reduces the change of the output gain while changing and setting the phase. In order to achieve this object, the notch filter uses a quadratic transfer function as shown in the following expression (2), and the attenuation coefficient uses a large value less than 1.0, such as 0.7 to below 1.0. Herein, s in the expression (2) represents the Laplacean.

$$\text{Transfer function } G = \frac{S^2 + 2\zeta\omega_n S + \omega_n^2}{S^2 + 2\omega_n S + \omega_n^2} \quad (1)$$

$$\zeta < 1.0$$

FIG. 6B illustrates the phase characteristics of the low boost filter 17b1 and the low-pass notch filter 17b2, where the thick broken line 65 shows the phase characteristic of the low-boost filter 17b1, and the thin solid line segment 66 shows the phase characteristic of the low-pass notch filter 17b2. The phase characteristic of the low boost filter 17b1 delays most at the midpoint between the first break frequency ω1 and the second break frequency ω4, and the phase characteristic of the low-pass notch filter 17b2 shows a phase lag on the low frequency side of the notch center frequency ω3 and a phase lead on the high frequency side of the notch center frequency ω3. The phase characteristic obtained by combining the low boost filter 17b1 and the low-pass notch filter 17b2 is shown by a thick solid line segment 67. In other words, the phase characteristic shows a large phase lag on the low frequency side of the notch center frequency ω3, and the cancelled phases of the low boost filter 17b1 and the low band notch filter 17b2 on the high frequency side of the notch center frequency ω3.

As described above, the phase of the frequency indicated by the broken line 26 of the first calculating filter 16a and the second calculating filter 16b advances by θ1 (27) (FIG. 2B). On the other hand, the phase of the low-pass notch filter 17b2 illustrated in FIG. 6B delays by θ3 (68) at the frequency shown by the broken line 26, and θ1 and θ3 cancel each other. Thereby, it is possible to improve the image stabilizing accuracy deterioration caused by the phase shift in the low frequency domain of the blur band. The phase advances by θ4 (69) due to the influence of the low-pass notch filter 17b2 at the frequency shown by the broken line 25, but as described above, the phase lag of the low boost filter 17b1 at this frequency cancels this phase lead. Therefore, the phase lead of the low-pass notch filter 17b2 does not deteriorate the image stabilizing characteristic.

Figure 7A:
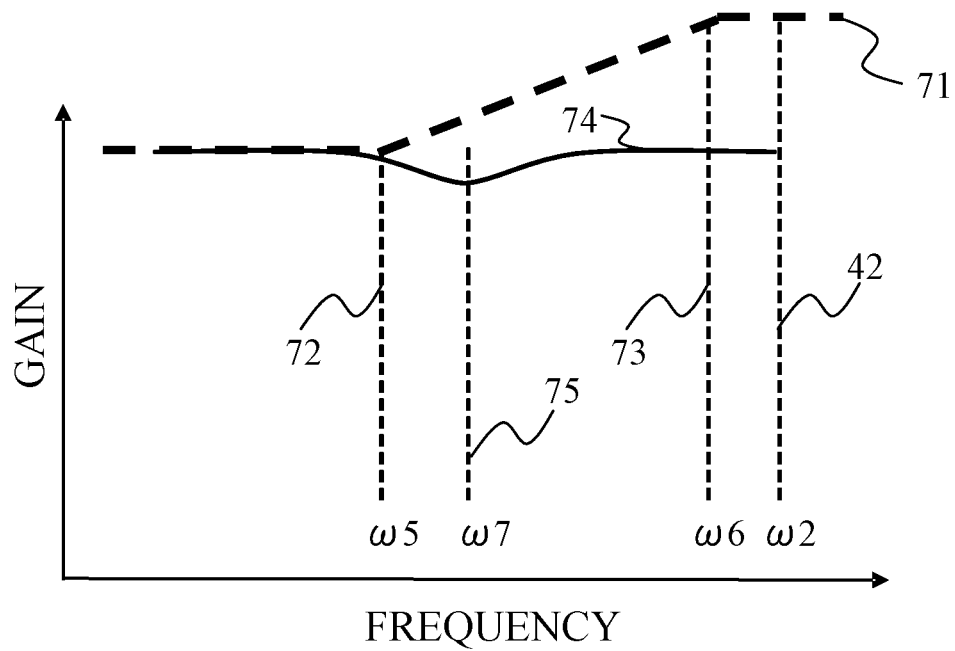
FIGS. 7A and 7B are Bode diagrams of a first correcting filter according to the first embodiment.
Figure 7B:
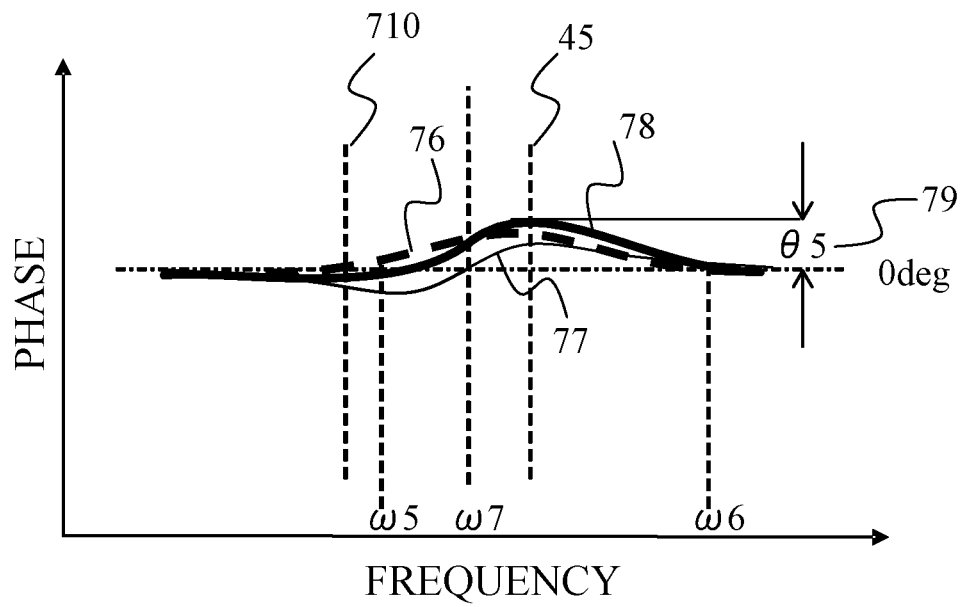

Referring now to FIGS. 7A and 7B, a description will be given of the frequency characteristics of the high boost filter 17a1 and the high-pass notch filter 17a2 that form the first correcting filter 17a. FIGS. 7A and 7B are Bode diagrams of the first correcting filter 17a. In FIGS. 7A and 7B, the abscissa axis represents a blur frequency, and the ordinate axis represents output gains (FIG. 7A) and phases (FIG. 7B) of the high boost filter 17a1 and the high-pass notch filter 17a2, respectively.

In FIG. 7A, a thick broken line segment 71 represents the output gain of the high boost filter 17a1. This sets the first break frequency and the second break frequency on the low frequency side of the crossover frequency ω2 (broken line 42) in FIG. 4A. According to this characteristic, the gain becomes higher as the frequency becomes higher from the first break frequency ω5 (broken line 72) to the second break frequency ω6 (broken line 73) on the high frequency side of the first break frequency ω5. A thin solid line segment 74 represents the output gain of the high-pass notch filter 17a2. The notch center frequency ω7 (broken line 75) is located between the first break frequency ω5 (broken line 72) and the second break frequency ω6 (broken line 73), and on the low frequency side of the center between the first break frequency ω5 and the second break frequency ω6. The transfer function of the notch filter is the same as that of the expression (2).

FIG. 7B illustrates the phase characteristics of the high boost filter 17a1 and the high-pass notch filter 17a2. A thick broken line 76 illustrates the phase characteristic of the high boost filter 17a1, and a thin solid line segment 77 illustrates the phase characteristic of the high-pass notch filter 17a2. The phase characteristic of the high boost filter 17a1 advances most at the midpoint between the first break frequency ω5 and the second break frequency ω6. On the other hand, the phase characteristic of the high-pass notch filter 17a2 is such that the phase delays on the low frequency side and advances on the high frequency side of the notch center frequency ω7. A phase characteristic obtained by combining the high boost filter 17a1 and the high-pass notch filter 17a2 is shown by a thick solid line segment 78. In other words, the phases of the high boost filter 17a1 and the high-pass notch filter 17a2 are canceled out on the low frequency side of the notch center frequency ω7, and the phase greatly advances on the high frequency side of the notch center frequency ω7.

As described above, the phase of the frequency indicated by the broken line 45 delays by θ2 (46) (FIG. 4B) due to the response lags of the first image stabilizer 13a and the second image stabilizer 14a. On the other hand, the combined phase of the high boost filter 17a1 and the high-pass notch filter 17a2 illustrated in FIG. 7B advances by θ5 (79) at the frequency shown by the broken line 45, and θ2 and θ5 cancel each other. Thereby, it is possible to improve the image stabilizing accuracy deterioration caused by the phase shift in the high frequency domain of the blur frequency band. The phase advances as indicated by the line segment 76 due to the influence of the high boost filter 17a1 at the frequency of the broken line 710, but as described above, the phase lag of the high-pass notch filter 17a2 cancels this phase advance. Therefore, the phase lead of the high boost filter 17a1 does not deteriorate the image stabilizing characteristic.

Figure 8A:
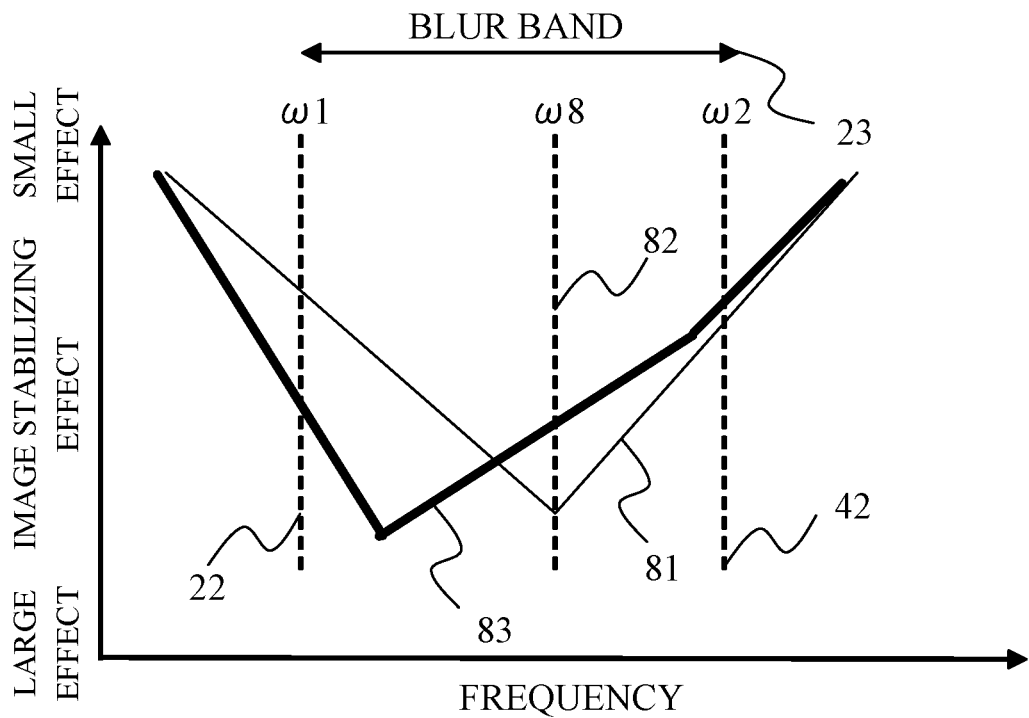
FIGS. 8A to 8C are Bode diagrams illustrating image stabilization effects according to the first embodiment.
Figure 8B:
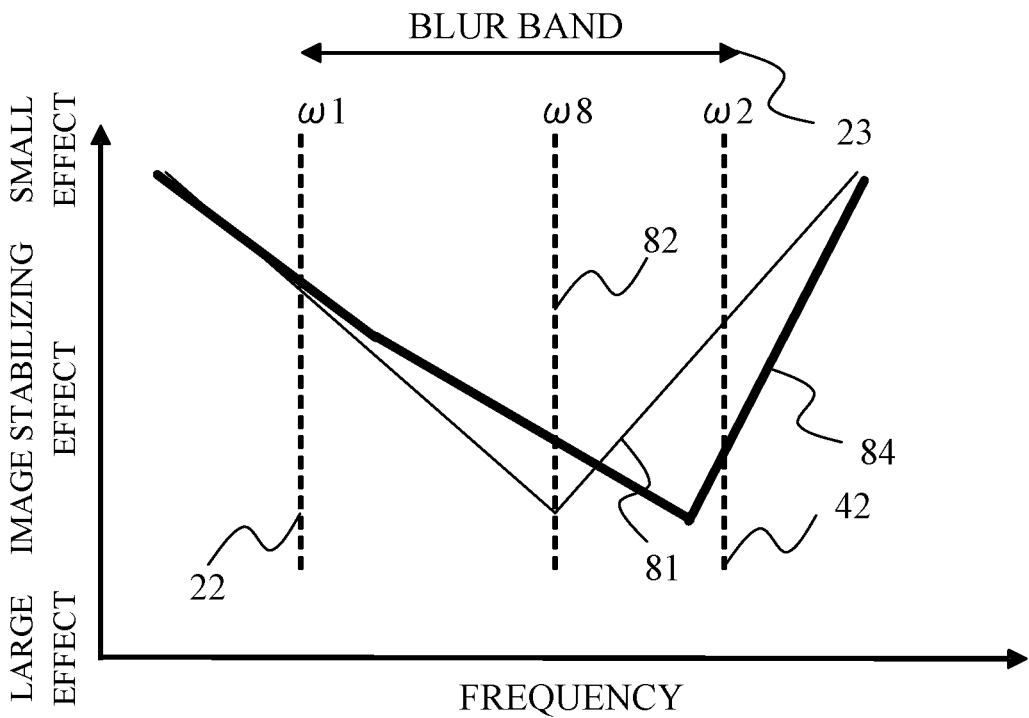
Figure 8C:
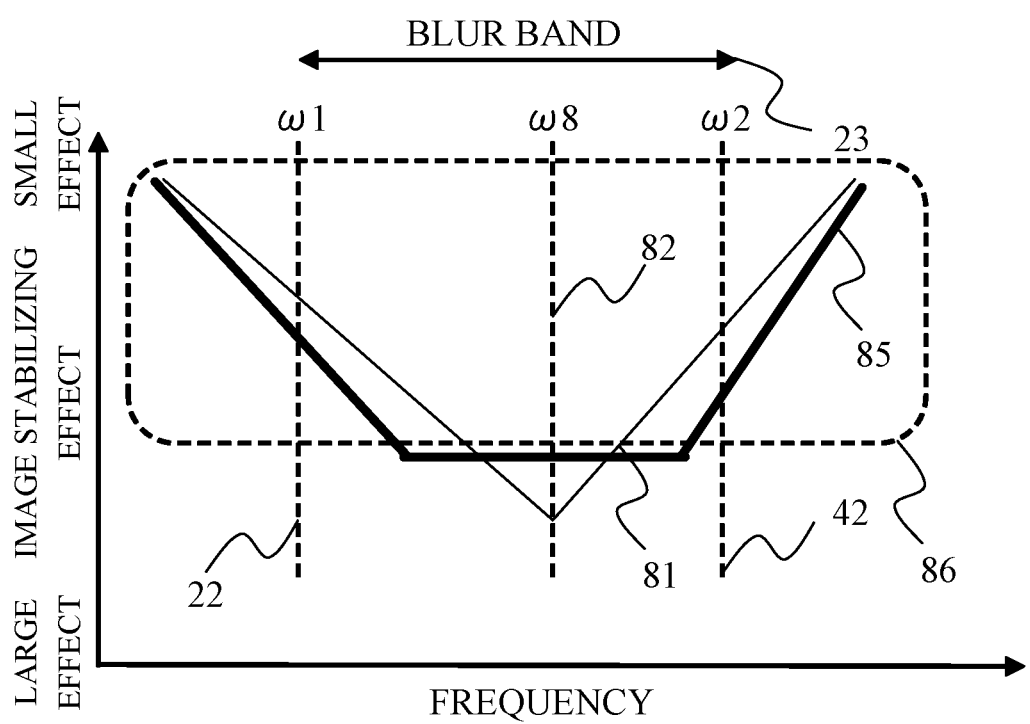

Referring now to FIGS. 8A to 8C, a description will be given of effects of the image stabilization according to this embodiment. FIGS. 8A to 8C are Bode diagrams for explaining the effects of the image stabilization. In FIGS. 8A to 8C, the abscissa axis illustrates the shake frequency, and the ordinate axis illustrates the effects of the image stabilization (how much the blur can be suppressed). The lower side the value becomes in the ordinate axis, the greater the image stabilization effect becomes.

A line segment 81 shows the image stabilization effect when the first correcting filter 17a and the second correcting filter 17b according to this embodiment are not connected. As indicated by the line segment 81, the image stabilization effect is greatest near the center frequency ω8 (broken line 82) of the shake band 23, and the image stabilization effects are small near the break frequency ω1 (broken line 22) and the crossover frequency ω2 (broken line 42). This is because accurate image stabilization is unavailable near the break frequency ω1 (broken line 22) due to the influence of the phase leads of the first calculating filter 16a and the second calculating filter 16b. Further, accurate image stabilization is unavailable near the crossover frequency ω2 (broken line 42) due to the influence of the phase lags of the first image stabilizer 13a and the second image stabilizer 14a.

In FIG. 8A, a line segment 83 illustrates an image stabilization effect when the second correcting filter 17b is connected in series to the second calculating filter 16b. Since the phase shift of the low frequency (ω1) is reduced, the image stabilization effect of the low frequency improves. However, the image stabilization effect at high frequencies due to the influence of the gain and phase of the second correcting filter 17b.

In FIG. 8B, a line segment 84 shows the image stabilization effect when the first correcting filter 17a is connected in series to the first calculating filter 16a. Since the phase shift of the high frequency (ω2) is reduced, the image stabilization effect at high frequencies improves. However, the image stabilization effect at low frequencies is reduced due to the influence of the gain and phase of the first correcting filter 17a.

A description will now be given of the operations of the first image stabilizer 13a and the second image stabilizer 14a. As described with reference to FIG. 1, the first image stabilizer 13a performs image stabilization based on the signal from the first correcting filter 17a, and the second image stabilizer 14a performs image stabilization based on the signal from the second correcting filter 17b. The image shift on the surface of the image sensor 14 is reduced by the cooperative operation of the first image stabilizer 13a and the second image stabilizer 14a.

FIG. 8C illustrates the image stabilization effect when the above cooperative operation is performed. As shown by a line segment 85, a high image stabilization effect can be obtained in a wide frequency band including a low frequency (ω1) and a high frequency (ω2). The image stabilization effect at the frequency ω8 (broken line 82) is that the line segment 81 not connecting the first correcting filter 17a and the second correcting filter 17b is higher than the line segment 85 connecting the first correcting filter 17a and the second correcting filter 17b. However, there is no substantial difference between the line segment 81 and the line segment 85, because the line segment 81 and the line segment 85 are outside the region where the photographer can identify the blurs (broken line area 86).

In order to obtain the image stabilization effect described with reference to FIG. 8C, it is necessary that the first image stabilizer 13a sufficiently performs image stabilization at high frequencies and the second image stabilizer 14a sufficiently performs image stabilization at low frequencies. However, as described with reference to FIG. 1, each of the first image stabilizer 13a and the second image stabilizer 14a bears half of the image stabilizing amount. Hence, the high-frequency image stabilization effect of the first image stabilizer 13a and the low-frequency image stabilization effect of the second image stabilizer 14a improve only by half of the ideal amount. Accordingly, this embodiment provides the driving adjuster 18 as illustrated in FIG. 1, and provides a control that differently adjusts the driving amounts for the first image stabilizer 13a and the second image stabilizer 14a in the low frequency domain and the high frequency domain.

Figure 9A:
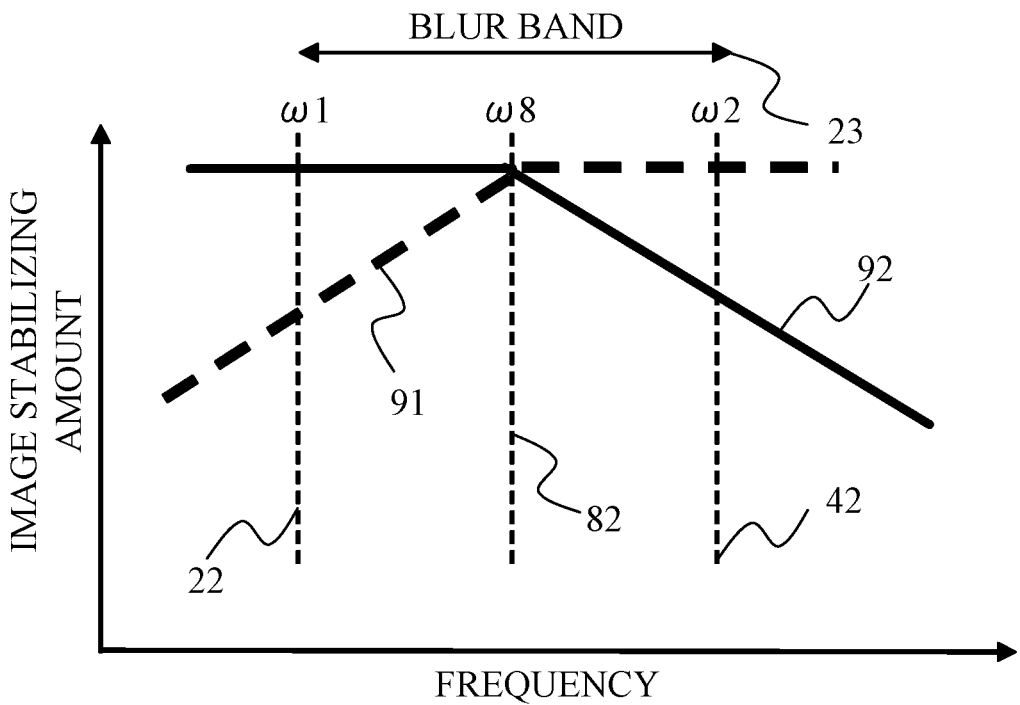
FIGS. 9A and 9B explain an operation of a driving adjuster according to the first embodiment.
Figure 9B:
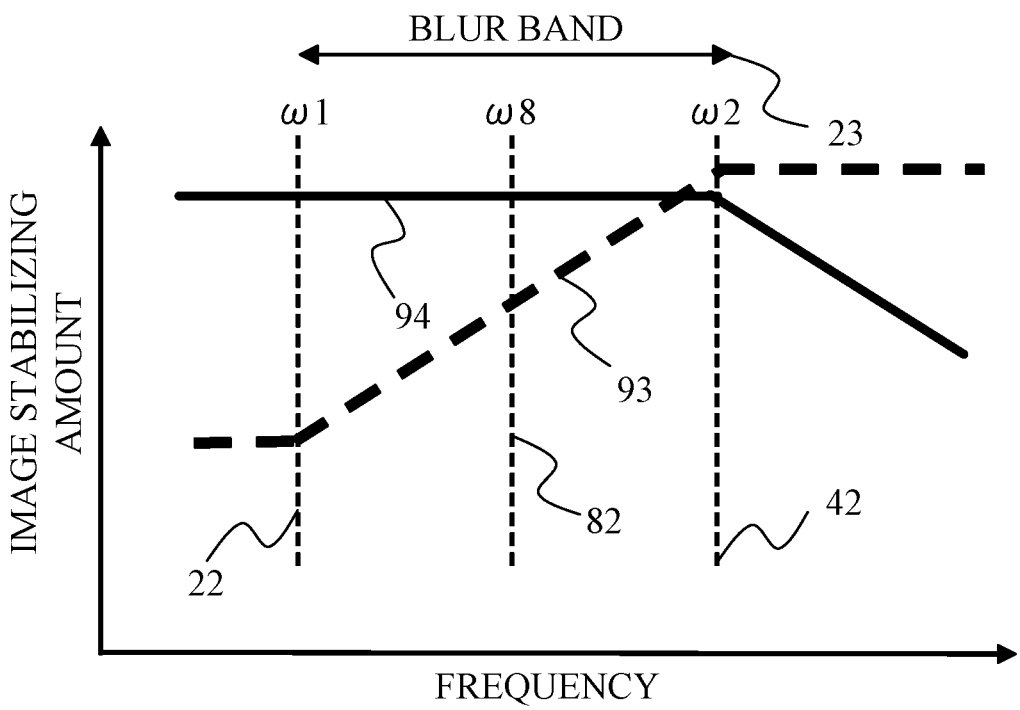

Referring now to FIGS. 9A and 9B, a description will be given of the operation of the driving adjuster 18. FIGS. 9A and 9B explain the operation of the driving adjuster 18. In other words, FIGS. 9A and 9B are Bode diagrams illustrating a control of the image stabilizing amounts of the first image stabilizer 13a and the second image stabilizer 14a by the driving adjuster 18. In FIGS. 9A and 9B, the abscissa axis represents a frequency and the ordinate axis represents the image stabilizing amounts of the first image stabilizer 13a and the second image stabilizer 14a. A broken line segment 91 indicates the image stabilizing amount of the first image stabilizer 13a, and forms a high-pass filter that attenuates the image stabilizing amount on a low frequency side of a frequency ω8 (broken line 82) located at a midpoint between the frequency ω1 (broken line 22) and the frequency ω2 (broken line 42) described above. Thereby, the first image stabilizer 13a provides high-frequency image stabilization. A solid line segment 92 indicates an image stabilizing amount of the second image stabilizer 14a, and serves as a low-pass filter that attenuates the image stabilizing amount on a high frequency side of the frequency ω8 (broken line 82). Thereby, the second image stabilizer 14a provides low-frequency image stabilization.

FIG. 9A schematically illustrates a frequency characteristic of the driving amount. The first image stabilizer 13a and the second image stabilizer 14a are simultaneously driven at the frequency ω8 (broken line 82) so that the image stabilizing amount is apparently doubled. Indeed, at the frequency ω8 (broken line 82), since the driving amounts for the first image stabilizer 13a and the second image stabilizer 14a are attenuated to half, a proper image stabilizing amount is provided through simultaneous driving.

In the above driving adjustment, the first image stabilizer 13a and the second image stabilizer 14a share the correction amount and perform the image stabilization near the frequency ω8 (broken line 82) where there are lots of camera shakes. Thus, the image stabilization stroke has a margin. Near the high frequency ω2 (broken line 42), the first image stabilizer 13a sufficiently corrects the high-frequency blurs based on the signal whose phase is compensated by the first correcting filter 17a. On the other hand, near the low frequency ω1 (broken line 22), the second image stabilizer 14a sufficiently corrects the low-frequency shakes based on the signal whose phase is compensated by the second correcting filter 17b. This configuration can provide highly accurate image stabilization in a wide blur range.

FIG. 9B illustrates a variation of the driving adjustment. In the variation illustrated in FIG. 9B, the first image stabilizer 13a serves as a high boost filter (broken line segment 93) in which the image stabilizing amount increases as the frequency becomes higher from the frequency ω1 (broken line 22) to the frequency ω2 (broken line 42). The second image stabilizer 14a has a low-pass filter in which the image stabilizing amount decreases on the high frequency side of the frequency ω2 (broken line 42). In the characteristic of FIG. 9B, since the first image stabilizer 13a and the second image stabilizer 14a share the driving amount between the frequency ω1 (broken line 22) and the frequency ω2 (broken line 42), easy driving can be provided in a wide frequency band.

Next follows a description of the image stabilization sequence. In general, the low-frequency shake has a large amplitude, and if the image stabilization is performed only by the second image stabilizer 14a during the imaging preparation, an image stabilizing stroke may run short during still image exposure. Since the high-frequency shakes have large energy, the first image stabilizer 13a may generate the image stabilization driving noises and the image stabilization may increase a power consumption. Accordingly, this embodiment connects the first correcting filter 17a and the second correcting filter 17b to the first calculating filter 16a and the second calculating filter 16b, respectively, only during a short period of still image exposure.

Figure 10:
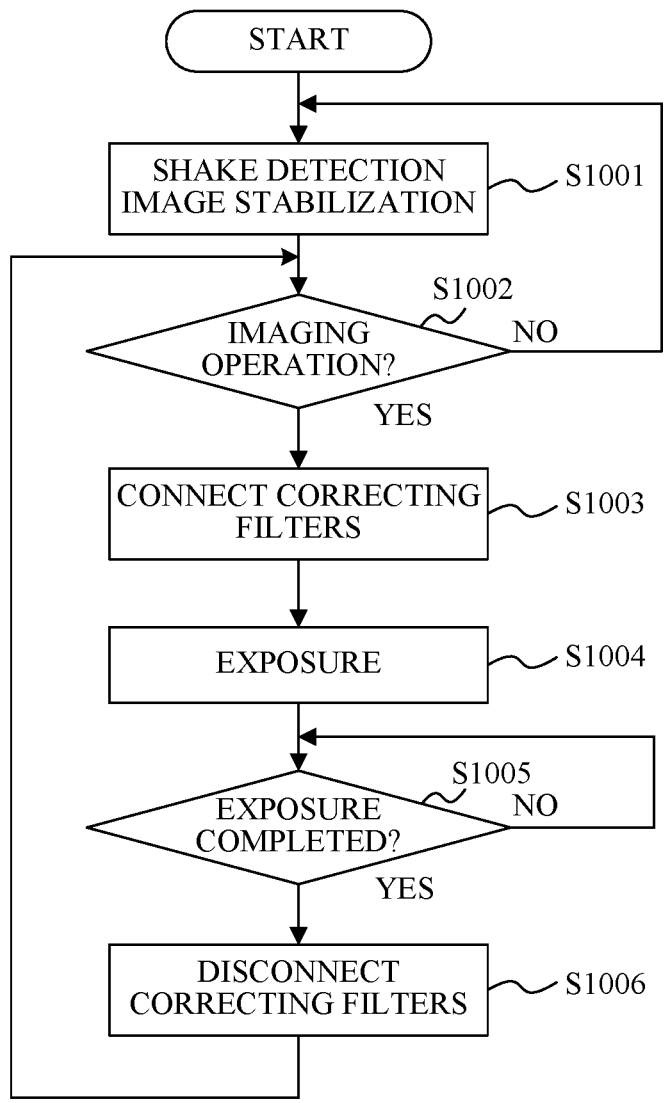
FIG. 10 is a flowchart showing connecting operations of the first correcting filter and the second correcting filter according to the first embodiment.

Referring now to FIG. 10, a description will be given of the connection operation of the first correcting filter 17a and the second correcting filter 17b. FIG. 10 is a flowchart showing the connecting operation of the first correcting filter 17a and the second correcting filter 17b. Each step in FIG. 10 is mainly executed by the camera CPU 12a or the lens CPU 12b, or by each component in the image pickup apparatus 100 based on an instruction from the camera CPU 12a or the lens CPU 12b. The flow in FIG. 10 starts in response to imaging preparation such as half-pressing a release button 19 in the image pickup apparatus 100.

First, in the step S1001, the camera CPU 12a (or the lens CPU 12b) starts the first shake detector 15a and the second shake detector 15b, respectively. The first calculating filter 16a and the second calculating filter 16b process the signals from the first shake detector 15a and the second shake detector 15b to generate target drive values. The camera CPU 12a starts the image stabilization by driving the first image stabilizer 13a and the second image stabilizer 14a based on the target drive value generated by each calculating filter.

Next, in the step S1002, the camera CPU 12a determines whether or not the imaging operation has been performed or still image exposure has started. If still image exposure starts, the flow proceeds to the step S1003. On the other hand, if the still image exposure has not yet started, the flow returns to the step S1001. In the step S1003, the camera CPU 12a connects the first correcting filter 17a and the second correcting filter 17b between the first calculating filter 16a and the first image stabilizer 13a and between the second calculating filter 16b and the second image stabilizer 14a. Then, the first image stabilizer 13a and the second image stabilizer 14a perform image stabilization based on the target drive values processed by the first correcting filter 17a and the second correcting filter 17b.

Next, in the step S1004, the camera CPU 12a performs an exposure (still image capturing) by performing an operation such as opening the shutter of the image pickup apparatus 100. Next, in the step S1005, the camera CPU 12a waits until the exposure time ends. When the exposure time ends, the flow proceeds to the step S1006. In the step S1006, the camera CPU 12a disconnects the first correcting filter 17a and the second correcting filter 17b connected between the first correcting filter 16a and the first image stabilizer 13a and between the second correcting filter 16b and the second image stabilizer 14a. In other words, the first correcting filter 17a and the second correcting filter 17b are disconnected. The camera CPU 12a directly connects the signals from the first calculating filter 16a and the second calculating filter 16b to the first image stabilizer 13a and the second image stabilizer 14a, and the flow returns to the step S1002.

In this embodiment, as illustrated in FIG. 10, the first correcting filter 17a and the second correcting filter 17b are connected to the first calculating filter 16a and the second calculating filter 16b only during a short period in which still image exposure is performed. As described above, when the first correcting filter 17a and the second correcting filter 17b are connected to the first calculating filter 16a and the second calculating filter 16b, respectively, the low-frequency image stabilizing effect improves. Thereby, the low-frequency movement of the image pickup apparatus 100, such as panning or framing change of the image pickup apparatus 100, is also blur-corrected, and the operability of the image pickup apparatus 100 may deteriorate. Accordingly, this embodiment connects the first correcting filter 17a and the second correcting filter 17b to the first calculating filter 16a and the second calculating filter 16b, respectively, only during still image exposure. Thereby, in addition to securing the image stabilizing stroke, to eliminating driving noises, and reducing the power consumption as described above, it is possible to suppress the deterioration in operability of the image pickup apparatus 100.

Thus, the control apparatus (image pickup apparatus 100) includes the calculating filter (first calculating filter 16a and second calculating filter 16b) and the correcting filter (first correcting filter 17a and second correcting filter 17b). The calculating filter performs a calculation process based on a signal from the shake detector (first shake detector 15a and second shake detector 15b) used for the image stabilization. The correcting filter is connected in series with the calculating filter. The correcting filter includes the boost filter (high boost filter 17a1 and low boost filter 17b1: line segments 61 and 71) and the notch filter (high-pass notch filter 17a2 and low-pass notch filter 17b2: line segments 63 and 74). The boost filter changes the gain based on the first frequency (first break frequencies $\omega 1$ and $\omega 5$) and the second frequency (second break frequencies $\omega 4$ and $\omega 6$). The notch filter has a center frequency (notch center frequencies $\omega 3$ and $\omega 7$) between the first frequency and the second frequency.

The boost filter is the low boost filter 17b1 that attenuates the gain between the first frequency ($\omega 1$) and the second frequency (AA) higher than the first frequency. The notch filter is the low-pass notch filter 17b2 having the center frequency ($\omega 3$) provided on the high frequency side of the center of the first frequency and the second frequency. The boost filter may be the high boost filter 17a1 that increases the gain between the first frequency ($\omega 5$) and the second frequency ($\omega 6$) higher than the first frequency. The notch filter is the high-pass notch filter 17a2 having the center frequency ($\omega 7$) provided on the low frequency side of the center of the first frequency and the second frequency. The correcting filter may have the first correcting filter 17a and the second correcting filter 17b. The first correcting filter may include the high boost filter and the high-pass notch filter. The second correcting filter may have the low boost filter and the low-pass notch filter.

The control apparatus may include the first image stabilizer 13a that performs the image stabilization based on the signal from the first correcting filter, and the second image stabilizer 14a that performs the image stabilization based on the signal from the second correcting filter. The control apparatus may include driving adjuster 18 that adjusts the driving amounts for the first image stabilizer and the second image stabilizer. The driving adjuster may adjust the driving amounts for the first image stabilizer and the second image stabilizer based on the shake frequency. The driving adjuster may set the image stabilizing amount of the second image stabilizer to be larger than that of the first image stabilizer in the first frequency domain (low frequency domain). The driving adjuster may set the image stabilizing amount of the first image stabilizer to be larger than that of the second image stabilizer in the second frequency domain (high frequency domain) higher than the first frequency domain.

The correcting filter may be connected to the calculating filter during exposure, and may not be connected to the calculating filter during non-exposure. The calculating filter, the correcting filter, and the driving adjuster may be provided to either the camera body 11a or the interchangeable lens 11b in the image pickup apparatus 100. The first calculating filter and the first correcting filter may be provided to the interchangeable lens 11b, and the second calculating filter and the second correcting filter may be provided to the camera body 11a.

This embodiment can realize highly accurate signal processing using the correcting filter that has a combination of the boost filter and the notch filter.

Second Embodiment

Figure 11:
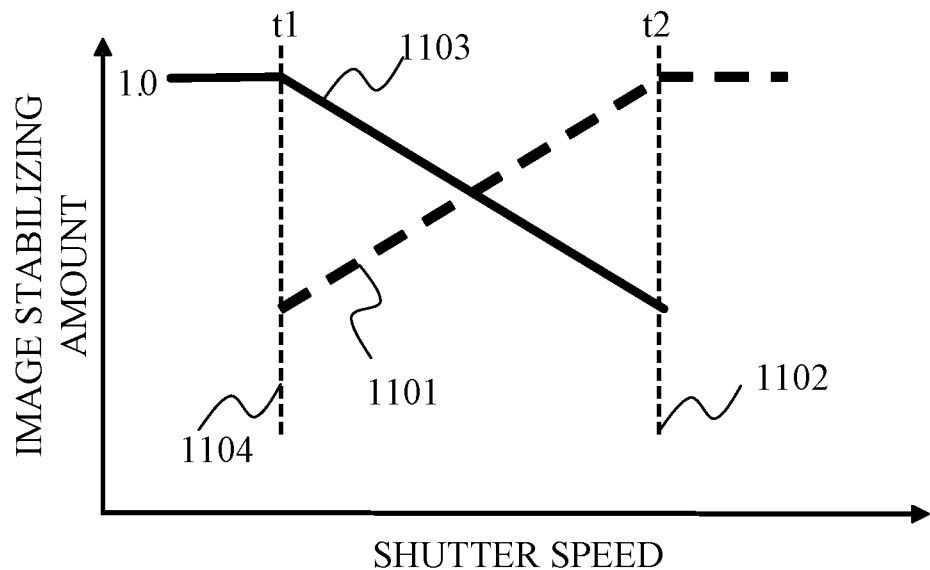
FIG. 11 explains a driving adjusting method of a driving adjuster according to a second embodiment.

Referring now to FIG. 11, a description will be given of a second embodiment of the present invention. FIG. 11 explains a driving adjustment method in the driving adjuster 18 according to this embodiment. In FIG. 11, the abscissa axis represents a shutter speed and the ordinate axis represents an image stabilizing amount.

A broken line 1101 represents an image stabilizing amount of the first image stabilizer 13a, and the driving amount is reduced at a shutter speed lower than a shutter speed t2 (such as 1/60 seconds) indicated by a broken line 1102. A solid line 1103 represents an image stabilizing amount of the second image stabilizer 14a, and the driving amount is reduced at a shutter speed higher than the shutter speed t1 (such as 1/4 second) shown by a broken line 1104. In general, large low-frequency blurs are dominant in the image plane shift at a low shutter speed. On the other hand, the low-frequency blurs do not affect the image plane shift and high-frequency blurs are dominant in the image plane shift at a high shutter speed.

Accordingly, in this embodiment, the first image stabilizer 13a, which is driven based on the signal from the first correcting filter 17a suitable for the high-frequency image stabilization, moves more at a high shutter speed. On the other hand, the second image stabilizer 14a, which is driven based on the signal from the second correcting filter 17b suitable for the low-frequency image stabilization moves more at a low shutter speed. This configuration enables highly accurate image stabilization in a wide frequency band.

Thus, in this embodiment, the driving adjuster 18 adjusts the driving amounts for the first image stabilizer 13a and the second image stabilizer 14a according to the shutter speed. In other words, at a low shutter speed (first shutter speed), the driving adjuster 18 sets the image stabilizing amount of the second image stabilizer 14a to be larger than that of the first image stabilizer 13a. On the other hand, at a high shutter speed (second shutter speed), the driving adjuster 18 sets the image stabilizing amount of the first image stabilizer 13a to be larger than that of the second image stabilizer 14a.

Third Embodiment

Figure 12:
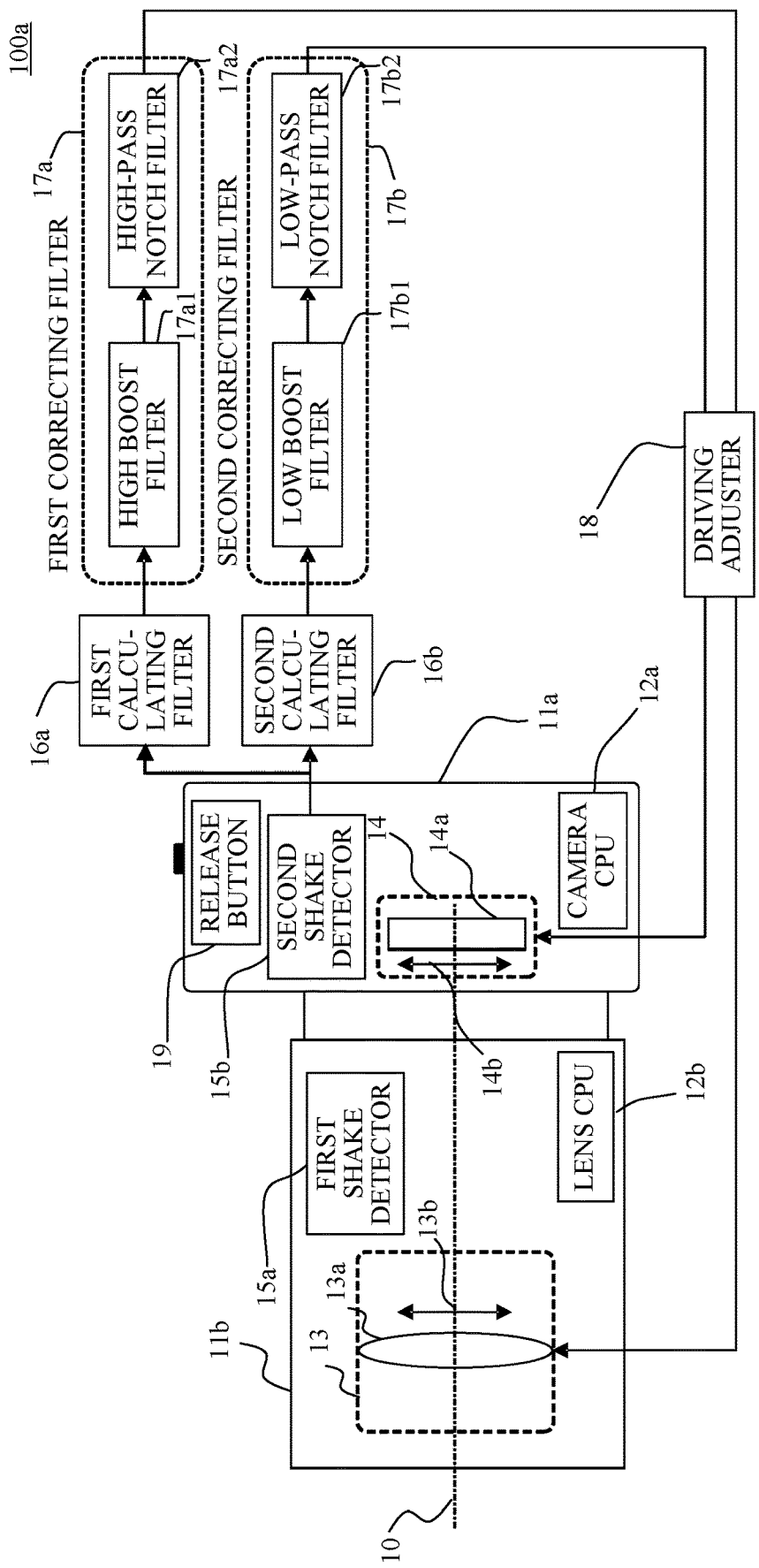
FIG. 12 is a cross-sectional view and a control block diagram of an image pickup apparatus according to a third embodiment.

Referring now to FIG. 12, a description will be given of a third embodiment of the present invention. FIG. 12 is a cross-sectional view and a control block diagram of the image pickup apparatus (camera) 100a according to this embodiment. The image pickup apparatus 100a according to this embodiment is different from the image pickup apparatus 100 according to the first embodiment in that the signal from the second shake detector 15b is input to each of the first calculating filter 16a and the second calculating filter 16b and the signal from the first shake detector 15a is not used.

In the image pickup system in which the camera body 11a and the interchangeable lens 11b are detachable from each other, the first shake detector 15a and the second shake detector 15b may often have different blur detecting performances. In such a case, the camera CPU 12a and the lens CPU 12b communicate with each other to determine a shake detector suitable to detect camera shakes, and the signal from the determined shake detector is sent to the first calculating filter 16a and the second calculating filter 16b, respectively. Thereby, even if the combination of the camera body 11a and the interchangeable lens 11b is different, it is possible to always perform highly accurate image stabilization by the shake detector suitable to detect camera shakes.

In FIG. 12, image stabilization is performed by the signal from the second shake detector 15b. However, when the shake detector 15a on the side of the interchangeable lens 11b is suitable to detect the camera shake, the image stabilization is performed by the signal from the first shake detector 15a. Due to this configuration can provide accurate image stabilization, even if the shake detector is not mounted on either the camera body 11a or the interchangeable lens 11b.

Fourth Embodiment

Figure 13:
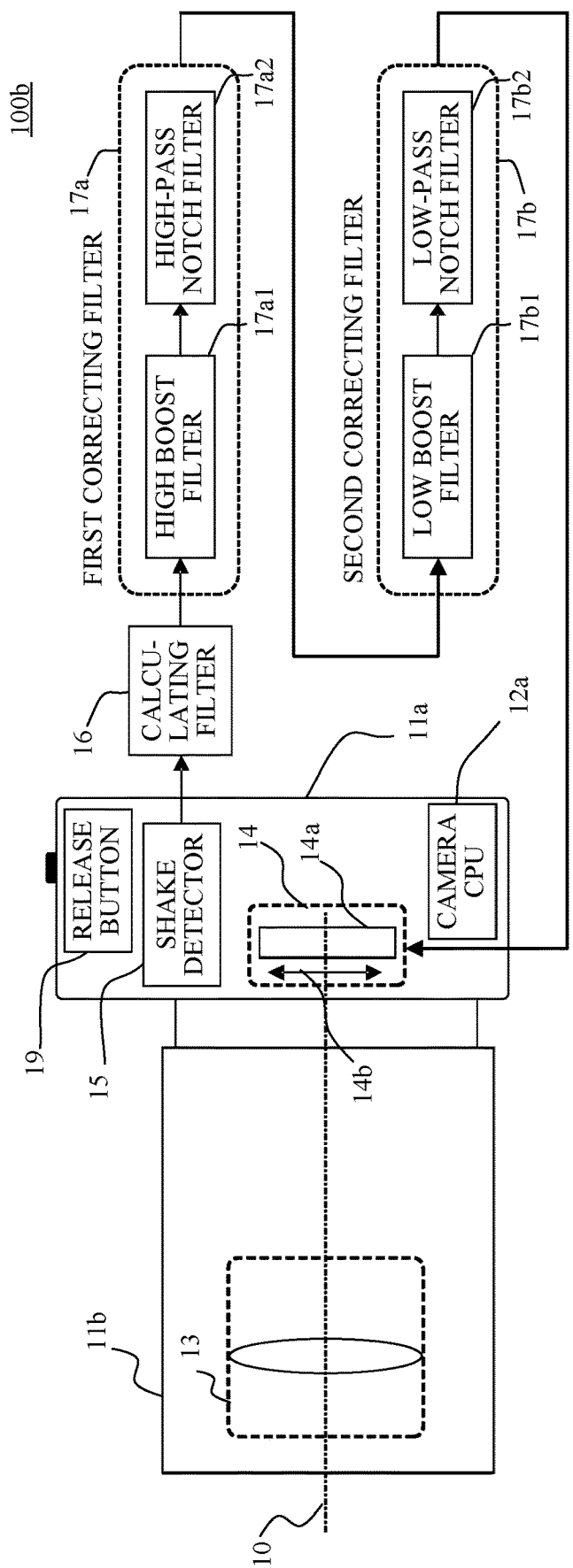
FIG. 13 is a cross-sectional view and a control block diagram of an image pickup apparatus according to a fourth embodiment.

Referring now to FIG. 13, a description will be given of a fourth embodiment according to the present invention. FIG. 13 is a cross-sectional view and a control block diagram of the image pickup apparatus (camera) 100b according to this embodiment. The image pickup apparatus 100b according to this embodiment is different from the image pickup apparatus 100 according to the first embodiment in that the interchangeable lens 11b is not equipped with the image stabilizing system (first shake detector 15a). The signal from the shake detector 15 in the camera body 11a is input to the calculating filter 16, and input to the image stabilizer 14a via the first correcting filter 17a and the second correcting filter 17b. The first correcting filter 17a includes a high boost filter 17a1 and a high-pass notch filter 17a2. The second correcting filter 17b includes a low boost filter 17b1 and a low-pass notch filter 17b2.

The low-frequency accuracy deterioration of the blur detection due to the characteristic of the calculating filter 16 is corrected by the second correcting filter 17b. The high-frequency accuracy deterioration of the image stabilization due to the response lag of the image stabilizer 14a is corrected by the first correcting filter 17a. Therefore, the accuracy of the image stabilizer 14a can be improved.

Each embodiment can provide a control apparatus, an image pickup apparatus, and a lens apparatus, each of which can improve image stabilization performance without increasing low-frequency noises.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154248, filed on Aug. 27, 2019, which is hereby incorporated by reference herein in its entirety.

What is claimed is:

1. A control apparatus comprising:
a calculating filter configured to perform a calculation process based on a signal from a shake detector used for an image stabilization; and
a correcting filter to which an output signal from the calculating filter is input,
wherein the correcting filter includes a boost filter configured to change a gain based on a first frequency and a second frequency, and a notch filter having a center frequency between the first frequency and the second frequency.

2. The control apparatus according to claim 1, wherein the boost filter is a low-boost filter configured to attenuate a gain between the first frequency and the second frequency higher than the first frequency, and
wherein the notch filter is a low-pass notch filter having the center frequency provided on a high frequency side of a center of the first frequency and the second frequency.

3. The control apparatus according to claim 2, wherein the boost filter is a high-boost filter configured to increase a gain between the first frequency and the second frequency higher than the first frequency, and
wherein the notch filter is a high-pass notch filter having the center frequency, which is provided on a low frequency side of a center of the first frequency and the second frequency.

4. The control apparatus according to claim 3, wherein the correcting filter includes a first correcting filter and a second correcting filter,
wherein the first correcting filter has the high boost filter and the high-pass notch filter, and
wherein the second correcting filter has the low boost filter and the low-pass notch filter.

5. The control apparatus according to claim 4, further comprising:
a first image stabilizer configured to drive part of an imaging optical system based on a signal from the first correcting filter for the image stabilization; and
a second image stabilizer configured to drive an image sensor based on a signal from the second correcting filter for the image stabilization.

6. The control apparatus according to claim 5, further comprising a driving adjuster configured to adjust driving amounts for the first image stabilizer and the second image stabilizer.

7. The control apparatus according to claim 6, wherein the driving adjuster adjusts the driving amounts for the first image stabilizer and the second image stabilizer based on a blur frequency.

8. The control apparatus according to claim 7, wherein the driving adjuster makes, in a first frequency domain, an image stabilizing amount of the second image stabilizer larger than that of the first image stabilizer, and
wherein the driving adjuster makes, in a second frequency domain higher than the first frequency domain, an image stabilizing amount of the first image stabilizer larger than that of the second image stabilizer.

9. The control apparatus according to claim 6, wherein the driving adjuster adjusts the driving amounts for the first image stabilizer and the second image stabilizer based on a shutter speed during exposure by the image sensor.

10. The control apparatus according to claim 9, wherein the driving adjuster makes an image stabilizing amount of the second image stabilizer larger than that of the first image stabilizer at a first shutter speed, and
wherein the driving adjuster makes an image stabilizing amount of the first image stabilizer larger than that of the second image stabilizer at a second shutter speed higher than the first shutter speed.

11. The control apparatus according to claim 1, wherein an output signal from the calculating filter is input to the correcting filter during exposure, and the output signal from the calculating filter is not input to the correcting filter during non-exposure.

12. An image pickup apparatus comprising:
an image sensor; and
a control apparatus,
wherein the control apparatus includes:
a calculating filter configured to perform a calculation process based on a signal from a shake detector used for an image stabilization; and
a correcting filter to which an output signal from the calculating filter is input,
wherein the correcting filter includes a boost filter configured to change a gain based on a first frequency and a second frequency, and a notch filter having a center frequency between the first frequency and the second frequency.

13. A lens apparatus comprising:
an imaging optical system; and
a control apparatus,
wherein the control apparatus includes:
a calculating filter configured to perform a calculation process based on a signal from a shake detector used for an image stabilization; and
a correcting filter to which an output signal from the calculating filter is input,
wherein the correcting filter includes a boost filter configured to change a gain based on a first frequency and a second frequency, and a notch filter having a center frequency between the first frequency and the second frequency.

* * * * *